United States Patent [19]

Watkins

[11] 4,174,032

[45] Nov. 13, 1979

[54] SHAKER CONVEYOR DRIVE MECHANISM

[75] Inventor: Charles L. Watkins, Chicago, Ill.

[73] Assignee: Goodman Equipment Corporation, Chicago, Ill.

[21] Appl. No.: 830,881

[22] Filed: Sep. 6, 1977

[51] Int. Cl.² .................................................. B65G 27/00
[52] U.S. Cl. ...................................... 198/761; 198/766
[58] Field of Search ............... 198/750, 752, 761, 766

[56] References Cited

U.S. PATENT DOCUMENTS

| 757,477 | 4/1904 | Marcus | 198/766 |
|---|---|---|---|
| 1,636,303 | 7/1927 | Hatfield | 198/766 |
| 2,447,393 | 8/1948 | Campion, Sr. | 198/761 |
| 3,367,197 | 2/1968 | Tabor et al. | 198/750 |
| 3,477,627 | 11/1969 | Webers | 198/750 |
| 3,486,608 | 12/1969 | Rogers | 198/750 |
| 3,986,603 | 10/1976 | Kamner | 198/761 |

FOREIGN PATENT DOCUMENTS 427096  7/1911  France .................................. 198/766

Primary Examiner—Richard A. Schacher
Attorney, Agent, or Firm—Fitch, Even & Tabin

[57] ABSTRACT

A drive mechanism for use with a shaker conveyor to effect longitudinal reciprocating movement of a conveyor trough is disclosed, the drive mechanism including a flywheel mounted for driving rotation about its center axis and connected to a slide block longitudinally movable along a lever arm mounted for pivotal movement in a plane perpendicular to the axis of rotation of the flywheel. The slide block is connected to the flywheel eccentric to its axis of rotation and the lever arm is connected to the conveyor trough so that constant speed rotation of the flywheel effects reciprocating movement of the conveyor trough in a manner to advance particulate material along the trough.

6 Claims, 6 Drawing Figures

U.S. Patent  Nov. 13, 1979  4,174,032
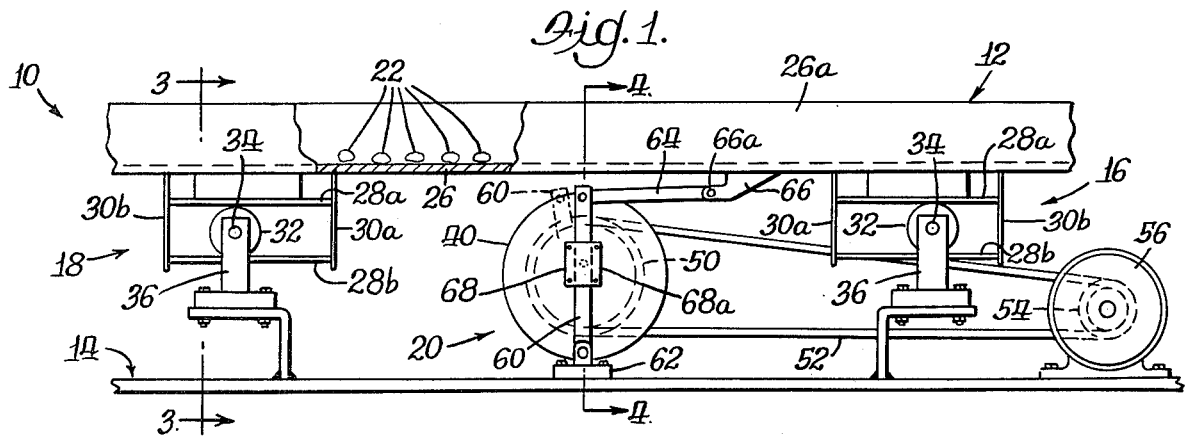
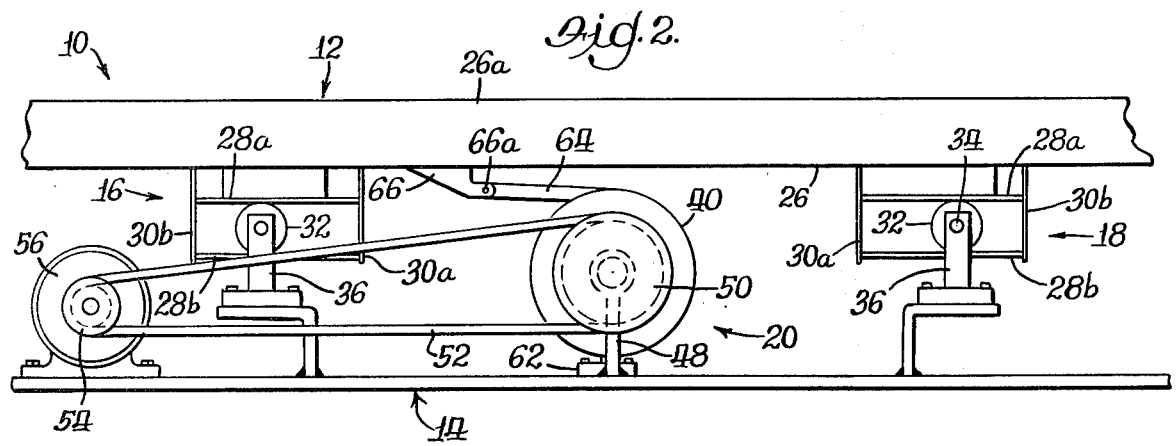
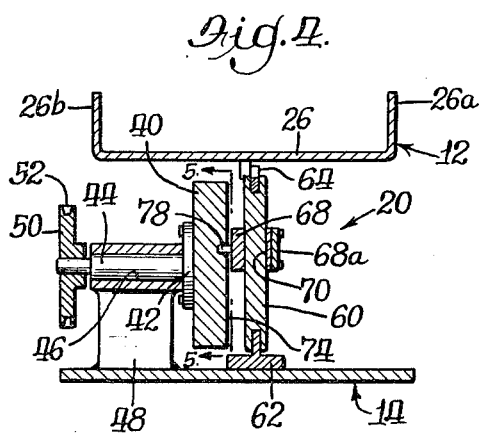
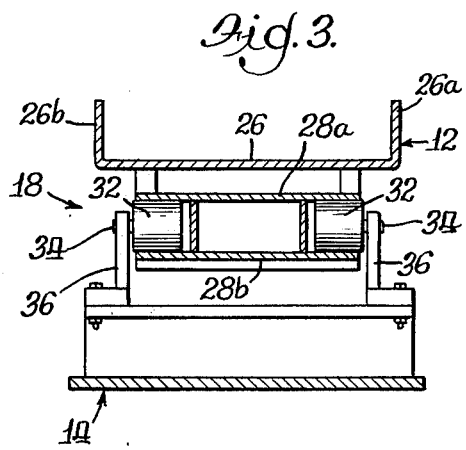
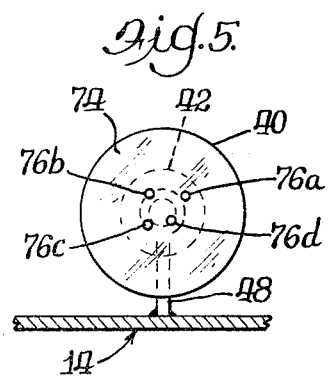
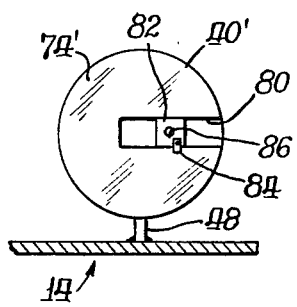

SHAKER CONVEYOR DRIVE MECHANISM

The present invention relates generally to drive mechanisms for shaker conveyors, and more particularly to a novel shaker conveyor drive which is relatively simple and inexpensive in construction and highly efficient in effecting movement of particulate material along a conveyor trough when in operative association therewith.

It is a common practice in material transfer systems to convey particulate material along a conveyor trough by selective reciprocating movement of the conveyor trough. For example, in furnace charging systems the particulate combustible material is frequently fed into the furnace by means of shaker conveyors which "shake" the particulate material, such as coal, along an associated conveyor trough into the furnace. Similarly, shaker conveyors find wide application in moving particulate matter such as various ores into smelting furnaces and the like.

The known prior art shaker conveyor drives for effecting movement of relatively heavy particulate material along conveyor troughs are quite massive and complex in design. While these known shaker conveyor drives are, for the most part, quite effective in conveying relatively heavy materials, they are not economically justifiable for conveying relatively lightweight particulate materials, such as aluminum ore or similar particulate matter. It is the latter application, e.g., the transfer of relatively lightweight particulate material, to which the shaker conveyor drive of the present invention is particularly directed.

Accordingly, one of the primary objects of the present invention is to provide a novel drive mechanism for use with a shaker conveyor and the like, which drive mechanism is relatively simple and inexpensive to manufacture yet highly efficient as a drive mechanism for a shaker conveyor.

Another object of the present invention is to provide a novel shaker conveyor drive mechanism having facility for relatively simple adjustment to change the acceleration characteristics of an associated conveyor trough, the drive mechanism being substantially unaffected by changes in environmental atmosphere.

A feature of the shaker conveyor drive mechanism in accordance with the present invention lies in its provision of a lever arm supported at one end for pivotal movement about a fixed pivot axis and carrying a slide block thereon which is connected to a flywheel eccentric to its axis of rotation, the lever arm being connected at an end thereof opposite its pivot axis to a conveyor trough so that constant speed rotation of the flywheel effects reciprocating movement of the conveyor trough in a manner to effect movement of particulate material therealong.

The various objects and advantages of the present invention, together with the organization and manner of operation thereof, will become apparent from the following detailed description of the invention when taken in conjunction with the accompanying drawing wherein like reference numerals designate like elements throughout the several views, and wherein:

FIG. 1 is a front elevational view of a shaker conveyor employing a drive mechanism in accordance with the present invention;

FIG. 2 is a rear elevational view of the shaker conveyor of FIG. 1;

FIG. 3 is a transverse sectional view taken substantially along the line 3—3 of FIG. 1, looking in the direction of the arrows;

FIG. 4 is a transverse sectional view taken substantially along the line 4—4 of FIG. 1, looking in the direction of the arrows;

FIG. 5 is a fragmentary sectional view taken substantially along the line 5—5 of FIG. 4 showing the face of the flywheel having slide block connecting openings therein at different eccentric distances from the axis of rotation of the flywheel to facilitate varying the stroke of the conveyor trough; and FIG. 6 illustrates an alternative manner of connecting the slide block eccentrically to the flywheel to provide greater variable adjustment.

Referring now to the drawing, and in particular to FIGS. 1 and 2, a shaker conveyor employing a drive mechanism in accordance with the present invention is indicated generally at 10. The shaker conveyor 10, which may be termed a flat-stroke shaker conveyor, includes a conveyor trough 12, supported on frame means 14 through identical bearing supports 16 and 18 for longitudinal reciprocal movement in a substantially horizontal plane. A drive mechanism, indicated generally at 20, is supported on the frame means 14 and is operatively associated with the conveyor trough 12 for effecting longitudinal reciprocating movement of the conveyor trough in a manner to advance particulate material, such as indicated at 22 in FIG. 1, along the conveyor trough in a predetermined direction therealong. As will become more apparent hereinbelow, the shaker conveyor 10 finds particular application in conveying relatively lightweight particulate material, such as aluminum ore and the like and lightweight articles of production, along the conveyor trough 12 and is adapted to convey the particulate material in either direction along the conveyor trough by merely reversing the direction of rotation of the drive mechanism 20.

Turning now to a more detailed description of the shaker conveyor 10 and the associated drive mechanism 20, the conveyor trough 12 has a flat bottom 26 the opposite longitudinally extending edges of which are formed upwardly to establish upstanding side walls 26a and 26b which with the bottom 26 define a predetermined path of travel for particulate material along the conveyor trough. In the illustrated embodiment, the conveyor trough 12 has pairs of upper and lower parallel guide plates 28a and 28b mounted at their opposite ends to transverse support plates 30a and 30b which are fixedly secured to the lower surface of the conveyor trough 26. The pairs of guide plates 28a, b define guide tracks therebetween to receive cylindrical support rollers 32 in guiding supporting relation therein. The support rollers 32 are mounted in opposed axially aligned pairs with each roller being supported on a support shaft 34 mounted on an upstanding bracket 36 secured on the frame means 14 so that the rollers support the conveyor trough for rectilinear reciprocating movement relative to the frame means. While the conveyor trough 12 is illustrated as being supported by pairs of rollers 32, it will be understood that any suitable support arrangement for the conveyor trough may be employed which facilitates longitudinal reciprocating movement of the conveyor trough.

The drive mechanism 20 in accordance with the present invention includes a drive member 40 which takes the form of a circular flywheel supported for rotation about its center axis. In the illustrated embodiment, the flywheel 40 is mounted on a circular mounting plate 42 secured on an inner end of a cylindrical drive shaft 44 journaled within a horizontal bore 46 in an upstanding support member 48 fixed on the frame means 14. The flywheel drive shaft 44 has a drive pulley 50 mounted on its outer end for connection through a drive belt 52 to a pulley 54 mounted on the output shaft of a suitable reversible constant speed electric drive motor 56. It will be appreciated that the pulleys 50 and 54 may be multiple grooved pulleys over which are reeved a plurality of drive belts to provide suitable connection for the flywheel 40 to the drive motor 56.

The drive mechanism 20 further includes a lever arm 60 which is pivotally connected at one end thereof to a fixed axis pivot block 62 mounted on the frame means 14. The end of the lever arm 60 opposite its pivotal connection to the pivot block 62 is pivotally connected to one end of a connecting or pull rod 64 which has its opposite end pivotally connected at 66a to a bracket 66 fixedly secured to the conveyor trough 12.

A slide block 68 is slidably carried by the lever arm 60 for movement longitudinally along the lever arm. In the illustrated embodiment, the lever arm 60 has a generally square transverse cross-sectional configuration and is received through a similarly configured bore 70 in the slide block 68 to facilitate sliding movement of the slide block along the lever arm 60. It will, however, be understood that the lever arm 60 may take substantially any desired transverse configuration, such as a cylindrical shape, with the bore 70 being suitably configured to facilitate sliding movement of the slide block along the lever arm. The slide block 68 has a removable cover plate 68a which facilitates assembly of the slide block on the lever arm 60.

The slide block 68 is connected to the flywheel 40 eccentrically to the axis of rotation of the flywheel so that rotation of the flywheel effects a reciprocating sliding movement of the slide block 68 along the lever arm 60 and a corresponding reciprocating pivotal movement of the lever arm 60 in a plane transverse to the axis of rotation of the flywheel 40. In the embodiment illustrated in FIGS. 4 and 5, the flywheel 40 has a planar surface 74 in which is formed a plurality of connecting openings, there being four equal size connecting openings 76a–d formed in the surface 74 of the illustrated flywheel which are equally angularly spaced about the axis of rotation of the flywheel at different radial distances from its axis of rotation. Each opening 76a–d is adapted to slidingly receive a connecting stub shaft 78 formed integral with or otherwise suitably secured to the slide block 68 to effect pivotal connection of the slide block to the flywheel 40. It will be understood that suitable sleeve or roller bearings may be provided within the openings 76a–d to receive the connecting shaft 78 therein if desired.

FIG. 6 illustrates an alternative manner of connecting the slide block 68 to the flywheel wherein substantially greater variation in the eccentric relationship of the slide block to the flywheel may be effected than the embodiment of FIGS. 4 and 5. As shown in FIG. 6, a flywheel 40' has a radial groove or slot 80 formed in the outer planar surface 74' of the flywheel. A connecting block 82 is mounted within the slot 80 and is selectively adjustable along the length of the slot to vary the eccentric relationship of the connecting block relative to the axis of rotation of the flywheel. The connecting block 82 may be fixed within the slot 80 at a selected radial position therein by any suitable means such as a sliding dovetail relation between the connecting block and slot and providing a locking bracket 84 on the connecting block which may be tightened against the flywheel. A central opening 86 is provided in the outer surface of the connecting block 82 to receive the connecting shaft 78 on the slide block 68 for sliding connection therewith. It will be understood that the connecting shaft 72 could be formed on the connecting block 82 and the opening 86 formed in the slide block 68.

In the operation of the shaker conveyor 10, the drive motor 54 is energized in a predetermined rotational direction so as to effect a corresponding rotation of the flywheel 40 or 40' at a predetermined constant rotational speed. Rotation of the flywheel 40 effects pivotal reciprocating movement of the lever arm 60 about its pivotal connection to the pivot block 62, the pivotal angle through which the lever arm reciprocates being established by connection of the slide block 68 to a selected one of the openings 76a–d in the flywheel surface 74, or by selective adjustment of the connecting block 82. Such reciprocating pivotal movement of the lever arm 60 effects longitudinal reciprocating movement of the conveyor trough 12, with the stroke of the shaker conveyor trough being established by the geometrical relationships between the eccentricity of the connection of the slide block 68 to the flywheel 40 or 40', the length of the lever arm 60 and the relative position of the slide block 68 on the lever arm.

Assuming the lever arm 60 to be positioned at its rearwardmost or left-hand pivotal position, as represented in phantom in FIG. 1, it can be seen that as the flywheel 40 rotates in a clockwise direction, the lever arm 60 undergoes movement in a first pivotal direction to effect a right-hand longitudinal movement of the conveyor trough 12 during which the conveyor trough undergoes a first rate of acceleration and deceleration. During a full forward or right-hand movement of the conveyor trough, the flywheel undergoes greater than one-half revolution, the exact angular displacement being a function of the distance between the connecting shaft 78 and the pivot axis between lever 60 and the pivot block 62.

As the flywheel completes a full revolution, the lever arm 60 reverses its pivotal direction and returns to its original position effecting a corresponding reverse longitudinal movement of the conveyor trough and returning it to its initial position at a second greater rate of acceleration and deceleration than effected during right-hand movement of the conveyor trough. It is the difference in intensity of conveyor trough travel, as represented by the different rates of acceleration during forward and reverse movement of the conveyor trough, that effects the transfer of particulate material along the conveyor trough, the conveyor trough serving to move the particulate material at a relatively slow rate of movement in a forward direction and being retracted at a greater rate of acceleration during which relative sliding movement between the conveyor trough and the particulate material takes place leaving the particulate material in its advanced position on the conveyor trough. Each successive reciprocating cycle of the conveyor trough thus effects an incremental advance of the particulate material along the length of the conveyor trough. Reversing the direction of rotation of the drive motor 54 is operative to reverse the direction of movement of the particulate material along the conveyor trough.

While the illustrated embodiment of the shaker conveyor drive mechanism 20 has been described as having the flywheel 40 or 40' mounted for rotation about a horizontal axis with the lever arm 60 pivotal in a vertical plane, the flywheel could be supported for rotation about a vertical axis and the lever arm mounted for pivotal movement in a substantially horizontal plane.

Thus, in accordance with the present invention, it can be seen that a relatively simple yet highly efficient drive mechanism for a shaker conveyor is provided which employs few components and which is particularly adapted for use in conveying lightweight particulate material along an associated conveyor trough. By selectively changing the length of the lever arm 60 and its eccentric connection to the flywheel 40, the length of stroke of the shaker conveyor trough may be changed to suit the material flow characteristics desired. The shaker conveyor drive mechanism 20 is particularly suited for operation in either cold or hot environments without the need for special coolants or lubricating heaters as required in more complex shaker conveyor drive mechanisms.

While a preferred embodiment of the present invention has been illustrated and described, it will be understood to those skilled in the art that changes and modifications may be made therein without departing from the invention in its broader aspects. Various features of the invention are defined in the following claims.

What is claimed is:

1. A shaker conveyor drive for use in effecting longitudinal reciprocating movement of a conveyor trough supported in fixed guideways so as to be movable only longitudinally, said conveyor drive comprising, in combination, a flywheel, means supporting said flywheel for rotation about a first axis of rotation, a lever arm, means supporting said lever arm at one end thereof for pivotal movement about a pivot axis transverse to said lever arm and spaced from said first axis of rotation, a slide block carried by said lever arm for movement longitudinally along said lever arm, said flywheel having a plurality of openings therein spaced circumferentially about its axis of rotation at different radial distances from said axis of rotation, said slide block having a connecting stub shaft thereon adapted for selective cooperation with said openings in said flywheel eccentric to the axis of rotation thereof, said lever arm being pivotally connected at its opposite end to said conveyor trough at a position spaced from said pivot axis, and means for effecting constant speed rotation of said drive member so as to effect reciprocal pivotal movement of said lever arm about its said pivot axis to reciprocate the conveyor trough with movement thereof in a first direction having greater acceleration than movement thereof in an opposite direction, the movement characteristics of said conveyor trough being variable in relation to connection of said slide block to different ones of said openings.

2. A shaker conveyor drive as defined in claim 1 wherein said flywheel is circular and symmetrical about its axis of rotation.

3. A shaker conveyor drive as defined in claim 1 wherein said means for effecting rotation of said drive member comprises a constant speed drive motor, and means connecting said drive motor to said drive member so as to effect constant speed rotation thereof.

4. A shaker conveyor drive as defined in claim 1 wherein said lever arm is of substantially uniform cross-sectional configuration throughout its length, said slide block having an axial bore therethrough suitable to slidably receive said lever arm therethrough.

5. A shaker conveyor drive as defined in claim 4 wherein said lever arm is supported for pivotal movement in a plane substantially normal to the axis of rotation of said drive member.

6. A shaker conveyor drive as defined in claim 5 wherein said drive member comprises a circular flywheel, said slide block having a connecting shaft thereon transverse to the axis of its axial bore and connected to said flywheel eccentric to the axis of rotation thereof.

* * * * *